(12) United States Patent
Piasecki (10) Patent No.: US 10,913,529 B1
(45) Date of Patent: Feb. 9, 2021

(54) LANDING GEAR (71) Applicant: Piasecki Aircraft Corporation, Essington, PA (US)

(72) Inventor: John W. Piasecki, Bryn Mawr, PA (US)

(73) Assignee: Piasecki Aircraft Corporation, Essington, PA (US)

(*) Notice: Subject to any disclaimer, the term of this patent is extended or adjusted under 35 U.S.C. 154(b) by 380 days.

(21) Appl. No.: 15/709,170

(22) Filed: Sep. 19, 2017

Related U.S. Application Data (60) Provisional application No. 62/397,271, filed on Sep. 20, 2016.

(51) Int. Cl.
| | |
|---|---|
| *B64C 25/26* | (2006.01) |
| *B64C 25/40* | (2006.01) |
| *B64C 25/14* | (2006.01) |
| *B64C 25/00* | (2006.01) |
| *B64C 5/02* | (2006.01) |
| *B64C 27/28* | (2006.01) |
| *B64C 39/02* | (2006.01) |

(52) U.S. Cl.
CPC ............... *B64C 25/26* (2013.01); *B64C 5/02* (2013.01); *B64C 25/14* (2013.01); *B64C 25/40* (2013.01); *B64C 27/28* (2013.01); *B64C 39/024* (2013.01); *B64C 2025/008* (2013.01); *B64C 2201/108* (2013.01); *B64C 2201/162* (2013.01); *B64C 2201/18* (2013.01)

(58) Field of Classification Search
CPC ... B64C 2025/008; B64C 25/01; B64C 25/02; B64C 25/04; B64C 25/08; B64C 25/10; B64C 25/14; B64C 25/52; B64C 25/54; B64C 25/58; B64C 25/66
See application file for complete search history.

(56) References Cited

U.S. PATENT DOCUMENTS

| | | | | |
|---|---|---|---|---|
| 3,246,861 | A * | 4/1966 | Curci ................. | B64C 29/0033 244/7 A |
| 5,395,073 | A * | 3/1995 | Rutan .................... | B64C 3/385 244/38 |
| 9,033,276 | B1 * | 5/2015 | Calvert ................... | B64C 25/32 |
| 9,045,226 | B2 * | 6/2015 | Piasecki ................ | G05D 1/102 |
| 9,731,816 | B2 * | 8/2017 | Harris, III .............. | B64C 25/14 |
| 10,011,351 | B2 * | 7/2018 | McCullough .......... | B64C 29/02 |
| 10,301,016 | B1 * | 5/2019 | Bondarev ........... | B64C 29/0033 |
| 10,315,761 | B2 * | 6/2019 | McCullough .......... | B64C 27/50 |
| 10,336,441 | B2 * | 7/2019 | Kim ....................... | B64D 31/06 |
| 2014/0217230 | A1 * | 8/2014 | Helou, Jr. .............. | B64C 25/14 244/17.17 |

(Continued)

*Primary Examiner* — Magdalena Topolski
*Assistant Examiner* — Marisa V Conlon
(74) *Attorney, Agent, or Firm* — Robert J. Yarbrough of Lipton, Weinberger & Husick (57) ABSTRACT

A plurality of landing gear are rotatable between a flight position and a landing position under the control of a control system on a vertical takeoff and landing aircraft. The plurality of landing gear may be separately and selectably rotatable to accommodate uneven or sloping terrain. The landing gear may include flight control surfaces and the degree of deployment of the landing gear controls the flight control surfaces. The flight control surfaces may include separately controllable elements. The aircraft may be a flight module of a modular and morphable air vehicle.

11 Claims, 12 Drawing Sheets

(56) References Cited

U.S. PATENT DOCUMENTS

2017/0217571 A1* 8/2017 Deng .................. B64C 25/10
2018/0312241 A1* 11/2018 Alber .................. B64C 25/10
2018/0370618 A1* 12/2018 Harris ................. B64C 25/12

* cited by examiner

LANDING GEAR

I. RELATED APPLICATION

This application is entitled to priority from U.S. Provisional Patent Application 62/397,271 filed Sep. 20, 2016, which is incorporated by reference as if set forth in full herein.

II. BACKGROUND OF THE INVENTION

A. Field of the Invention

The Invention is a landing gear for a vertical takeoff and landing aircraft. Each of a plurality of landing gear may be independently deployable as determined by a control system to allow the aircraft to land and take off from uneven or sloping terrain. The landing gear may have control surfaces to provide redundant control effectors and additional control authority for the aircraft. The landing gear of the invention is particularly useful to provide redundant and additional control authority for a flight module of a modular and morphable air vehicle. The landing gear of the invention may be used to provide additional and redundant control authority for any aircraft having landing gear, particularly vertical takeoff and landing aircraft.

B. Description of the Related Art

U.S. Provisional Patent Application 61/345,535, filed May 17, 2010 by John W. Piasecki and others and U.S. Provisional Patent Application No. 61/416,965 filed Nov. 24, 2010 by John W. Piasecki and others are hereby incorporated by reference in this document as if set forth in full herein. U.S. Pat. No. 9,045,226 to the same inventors issued Jun. 2, 2015 is incorporated by reference in this document as if set forth in full herein. U.S. Pat. No. 9,393,847 issued Jul. 19, 2016 and U.S. Pat. No. 9,610,817 issued Apr. 4, 2017 also are hereby incorporated by reference as if set forth in full herein.

The documents incorporated by reference disclose a modular and morphable air vehicle that includes an unmanned flight module, referred to as an 'air module' in the documents incorporated by reference. The flight module is configured to selectably support a mission module in flight. The mission module is referred to as a 'ground module' in the documents incorporated by reference. One of the embodiments of the modular and morphable air vehicle has two ducted fans configured to support the flight module in flight. The flight module and mission module combination or the flight module alone may fly as a rotary wing aircraft in a side-by-side configuration and also may fly as a fixed wing aircraft in a tilted-rotor configuration. The flight module may move between the side-by-side and tilted-rotor configurations 'in stride;' that is, during flight. The tilted-rotor configuration is suitable for high-speed flight. The side-by-side configuration is suitable for low-speed and hovering flight. The flight module may have other configurations as disclosed in the in documents incorporated by reference.

For the flight module having a pair of ducted fans that are tiltable between the side-by-side configuration and the tilted-rotor configuration, the flight module control system may use monocyclic pitch of the pair of ducted fans to apply a pitching moment to the flight module to control the pitch of the flight module when the flight module is flying in the tilted-rotor configuration.

The mission module may be a wheeled passenger vehicle and may be driven on the ground under its own power either with or without the flight module attached. The mission module may be a medical module, a cargo module, a weapons module, a passenger module, a communications module, or any other mission module disclosed by the documents incorporated by reference.

III. BRIEF DESCRIPTION OF THE INVENTION

The invention is a landing gear for an aircraft, particularly a vertical takeoff and landing aircraft. The aircraft may be the flight module of the modular and morphable air vehicle as disclosed in the documents incorporated by reference. This document will discuss the Invention as applied to the flight module for purposes of illustration, but the discussion applies equally to use of the Invention for any other aircraft.

The landing gear of the Invention is attached to the flight module and is rotatable between a flight position and a landing position. In the landing position, the landing gear depends from the flight module and is capable of straddling a mission module and supporting the flight module and the mission module on the ground. In the flight position, the landing gear extends in the forward or the aft direction from the central unit of the flight module, which reduces the drag created by the landing gear when the flight module is flying at high speed in the tilted-rotor configuration.

The landing gear may comprise a plurality of landing gear, each of which defines a ground-engaging portion and each of which is separately and selectably deployable under the control of a control system. When the flight module is approaching the ground for landing, sensors such as LIDAR, RADAR and optical sensors inform the control system as to the terrain. The control system infers the relative elevations of each location at which the ground-engaging portions of the landing gear will contact the ground. The control system commands effectors for each of the landing gear to deploy to an appropriate degree of deployment to maintain the flight module in an adequately level condition after the flight module has landed. As used in this document and the claims, the 'degree of deployment' is the angle defined by the rotatable landing gear and a horizontal plane passing through a longitudinal axis of the aircraft when the aircraft is in level flight. The 'degree of deployment also includes the angle of the landing gear laterally with respect to the longitudinal axis of the aircraft. The 'degree of deployment' also means the selectable length of the landing gear under the control of the control system. The three parameters of the angle defined by the landing gear with respect to the horizontal plane, the angle of the landing gear compared to the longitudinal axis, and the landing gear length describe the location of the landing gear in space and together define the 'degree of deployment.'

Any of the landing gear may include one or more landing gear control surfaces attached to the landing gear. The landing gear control surface is exposed to the stream of air moving past the landing gear when the flight module is in flight. The landing gear control surface provides additional and redundant control authority to the flight module control system. The landing gear control surface is particularly useful for a flight module when the flight module is flying in the tilted-rotor configuration. With the flight module in the tilted-rotor configuration and the landing gear in the flight position, the control surface provides pitch control authority that is redundant and in addition to the pitch control authority provided by other pitch control options, such as monocyclic pitch of the ducted fans.

Each feature, such as the at the landing gear control surface, that provides control redundancy provides the flight module control system with more control options and with additional control authority. The control redundancy and additional authority may extend the flight envelope of the flight module and allow the control system to optimize the performance of the flight module. The control redundancy and additional authority also may allow the control system to compensate for a loss of other control authority due to damage or system failure. While this document describes the landing gear of the Invention in terms of a flight module having a pair of ducted fans as described by the documents incorporated by reference, the invention is not so limited and may be used to provide additional control authority and redundant control effectors for any aircraft.

The landing gear comprises forward landing gear and aft landing gear. The forward landing gear extends in the forward direction from the front of the flight module when the landing gear is in the flight position. The forward landing gear is rotatable about a hinge to extend downward when the landing gear is moved to the landing position. The aft landing gear extends in the aft direction from the rear of the flight module when the landing gear is in the flight position and is rotated about a hinge to extend generally downward when the landing gear is in the landing position. The landing gear in the landing position extends far enough below the flight module to straddle a mission module and to support the flight module and mission module when the flight and mission module combination is on the ground.

The control surface is disposed on the landing gear proximal to a ground-engaging portion of the landing gear. Control surfaces may be disposed on the aft landing gear, the forward landing, or on both the aft and forward landing gear. The landing gear defines a moment arm transmitting the relatively small control force acting on the control surface as a control moment to the flight module. The moment arm defined by the landing gear is adequately long so that the control moment generated by the control surface is useful to the control system to assist in controlling the attitude of the flight module.

The landing gear defines a landing gear length from the hinge to the ground-engaging portion or to the control surface. The landing gear length may be selectable under the control of a control system. The selectable landing gear length allows the length of the moment arm to be selected by the control system to apply more or less control authority to the aircraft by the control surface. The selectable landing gear length also allows the landing gear to accommodate greater irregularity in the terrain during landing and when on the ground. The landing gear length may be adjusted by any suitable mechanism. For example, a lower end of the landing gear may telescope into an upper end of the landing gear. Rotation of a lead screw attached to the upper end of the landing gear may engage a nut attached to the lower end of the landing gear, adjusting the length of the telescoping landing gear. As an alternative, a landing gear may fold to adjust its length. As a second alternative, an extension of a hydraulic cylinder or the action of a pinion gear driven by a motor on a rack gear may provide the power to extend or retract the landing gear. Any apparatus known in the art may be used to extend or retract the landing gear.

The control moments generated by the control surfaces may be controlled in at least two other ways. First, a control surface may define movable individual elements under the control of the control system, in the same manner that a conventional rudder, elevator or canard is controlled. If the control surface is 'V' shaped, then either side of the 'V' may define an individual control element, which may be controlled in the same manner as a rudder/elevator of a V'-tailed conventional aircraft to provide pitch moments and yaw moments to the flight module. If the landing gear defines a port and a starboard aft landing gear and each of the port and starboard aft landing gears includes a V-shaped control surface having individual elements, then the two (or more) V-shaped control surfaces also may provide a selectable rolling moment to the flight module, in addition the pitch and yaw moments.

The second manner in which the control surface(s) may be controlled is by rotation of the landing gear about its hinges under the control of the control system to change the angles of attack of the control surfaces attached to the landing gear.

For example, the landing gear may define a port side aft landing gear and a starboard side aft landing gear disposed on either side of a central unit of the air module. The control system can select the pitching and rolling moments applied by the control surfaces to the central unit by selecting the angle of the port side and starboard side landing gear with respect to the longitudinal axis of the central unit. Moving the port and starboard side landing gear and control surfaces differentially will impart a rolling moment while moving the port and starboard side control surfaces non-differentially will apply a pitching moment. For example, if the flight module is flying in the tilted-rotor configuration with the landing gear in the flight position, rotating the port side aft landing gear so that it defines an angle above the longitudinal axis of the central unit and rotating the starboard side aft landing gear so that it defines an angle below the longitudinal axis of the central unit will apply a rolling moment tending to roll the flight module to the left. If both the port side and starboard side aft landing gear is moved to the same angle above the longitudinal axis, then the control surfaces will provide a pitching moment tending to pitch the front of the flight module up.

The control system may control the forward landing gear separately from the aft landing gear and may control the port side landing gear separately from the starboard side landing gear. As a first example, the control system may rotate the forward landing gear downward, tending to pitch the flight module down, and simultaneously pitch the aft landing gear up, tending to pitch the flight module up. The resulting increased drag will serve as an air brake, allowing the control system to slow the flight module rapidly without changing its attitude. As a second example, the control system may pitch the port side forward landing gear downward while leaving the remainder of the landing gear undisturbed in the flight position. In this second example the control force acting on the control surface on the port side forward landing gear with apply a control moment tending to pitch the flight module down and roll the flight module to the left.

The drag presented by the landing gear as affected by the angle of the landing gear with respect to the longitudinal axis of the central unit may provide adequate control authority to the control system even without control surfaces attached to the landing gear. The ground-engaging portions of the landing gear may define the control surfaces.

V. DESCRIPTION OF AN EMBODIMENT

Figure 1:
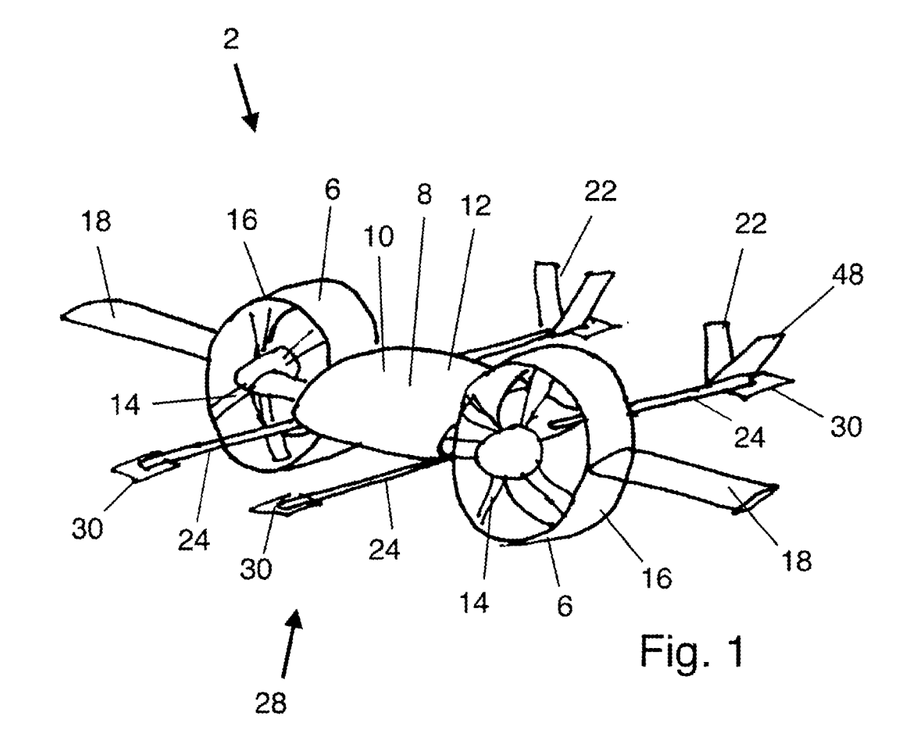
FIG. 1 is a perspective view of the flight module in the tilted-rotor configuration with the landing gear in the flight position extending generally parallel to the direction of flight of the flight module.
Figure 2:
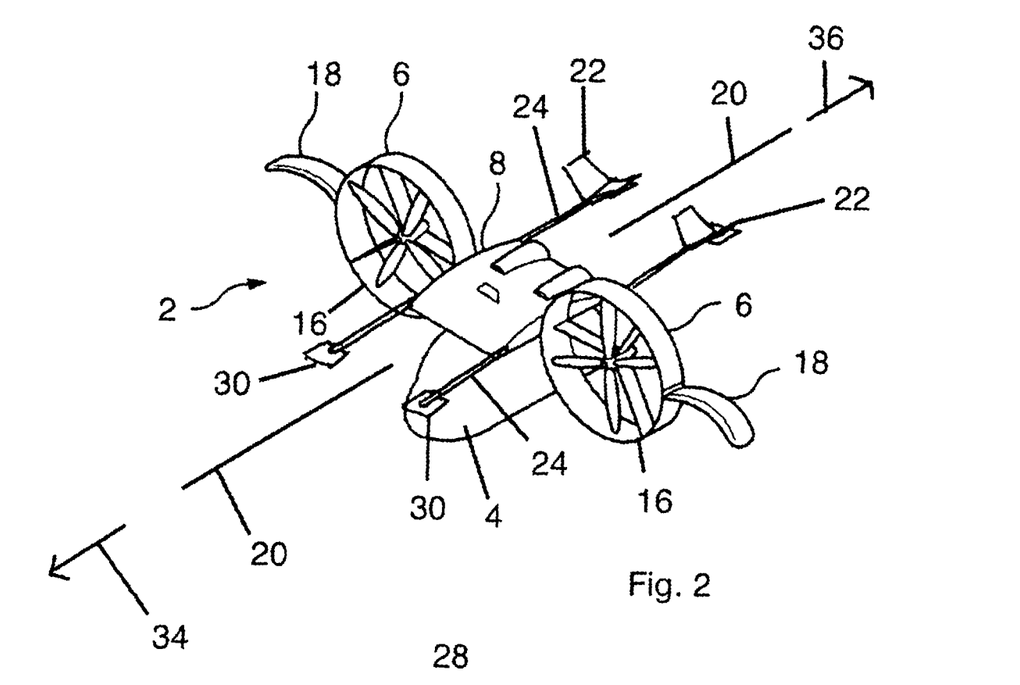
FIG. 2 is a perspective view of the flight module in the tilt-rotor configuration with the landing gear in the flight position and extending in the fore and aft directions from the central unit of the flight module.

Each of FIGS. 1-12 illustrates a flight module 2. The flight module 2 may fly without a mission module 4 attached, as shown by FIG. 1, or with a mission module 4 attached, as shown by FIG. 2. The mission module 4 may be any of the mission modules 4 included in the documents incorporated by reference. From FIGS. 1 and 2, the flight module 2 features a pair of ducted fans 6. The ducted fans 6 are connected to a central unit 8. The central unit 8 may house the engine(s) 10, drive system for the two ducted fans 6, starter batteries, flight avionics, optional sensors, communications relays and control system 12. Each ducted fan 6 includes a rotor 14 and a duct 16 enclosing the rotor 14.

The flight module 2 may fly through the air in a tilted-rotor configuration as illustrated by FIGS. 1, 2, 5-8, in which the axes of rotation of the rotors 14 are generally parallel to the longitudinal axis 20 of the central unit 8 and the longitudinal axis 20 is generally aligned with the direction of flight, indicated by forward direction 34. From FIGS. 5 and 8, the central unit may define a fuselage 68 having a fuselage leading 70 edge and a fuselage trailing edge 72. The flight module 2 may include wing extensions 18 to provide additional lift when the flight module 2 is flying in the tilted-rotor configuration.

Figure 11:
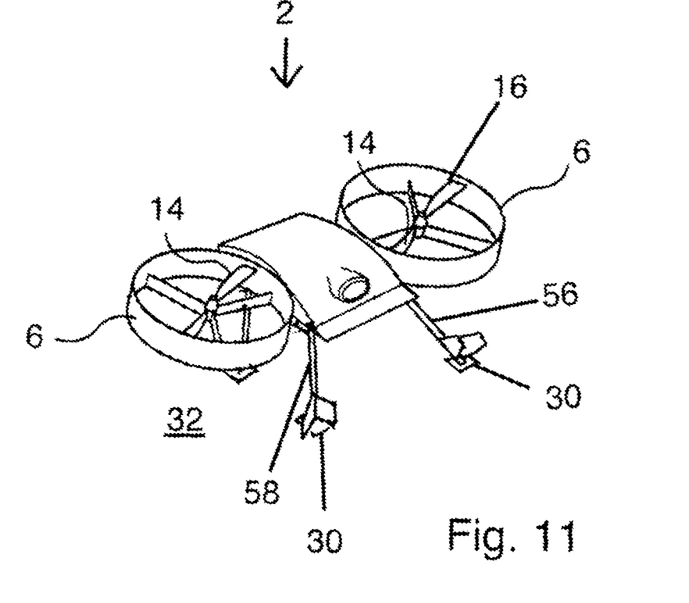
FIG. 11 is a perspective view of the flight module in the side-by side configuration with the landing gear in the landing position.
Figure 12:
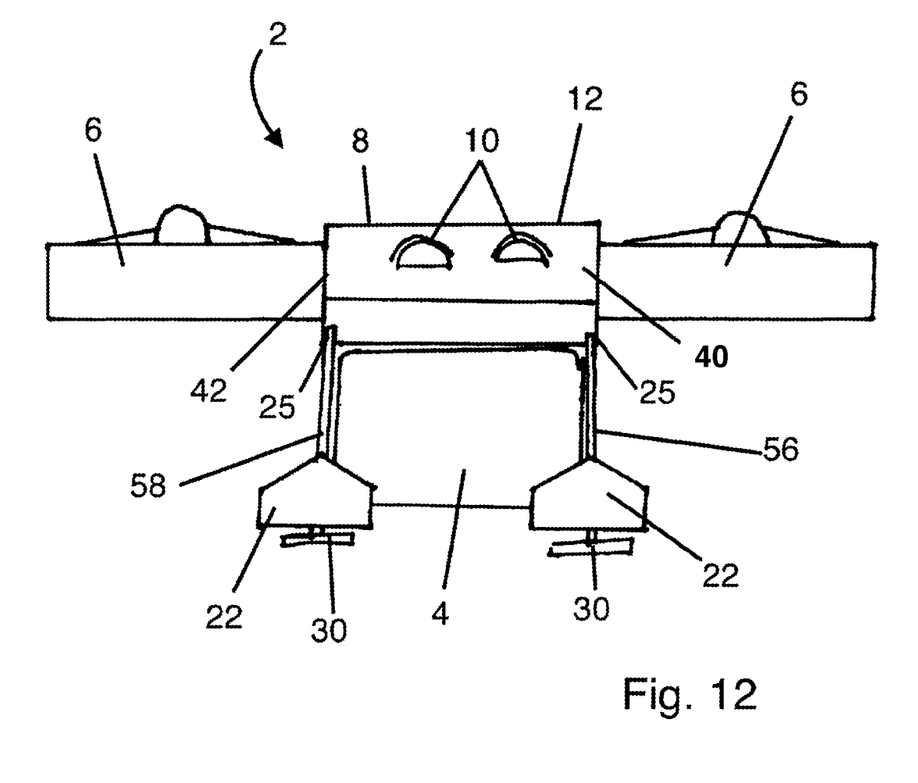
FIG. 12 is a rear view of the flight module with the mission module attached and the landing gear in the landing position.

The flight module 2 may fly in the side-by-side configuration illustrated by FIGS. 11 and 12 in low speed and hover in which the axes of rotation of the rotors 14 of the ducted fans 6 are oriented generally normal to the longitudinal axis 20 of the central unit 8. The flight module 2 may fly in any configuration intermediate to the side-by-side configuration and the tilted-rotor configuration. The flight module 2 may have any other configuration taught by the documents incorporated by reference.

FIGS. 1 through 12 also illustrate the landing gear 24 of the flight module 2. The landing gear 24 may have one or more control surfaces 22. Landing gear 24 has a flight position 28 illustrated by FIGS. 1, 2, and 5-8 and a landing position 26 illustrated by FIGS. 9-12. In the flight position 28, forward landing gear 44 extend in the forward direction 34 from the flight module 2 while aft landing gear 46 extend in the aft direction 36 from the flight module 2. In the flight position 28, landing gear 24 create less drag due to movement of the flight module 2 through the air in the forward direction 34 than if the landing gear 24 are in the landing position 26.

In the landing position 26, the landing gear 24 is configured to support the flight module above the surface of the ground 32. The term 'ground 32' includes any surface that may support the flight module, such as a deck of a ship. Ground-engaging portions 30 contact the ground and support the landing gear 24. The landing gear 24 is rotatably attached to the central unit 8. To move to the flight position 28 from the landing position 26, the control system 12 commands an actuator to cause the forward landing gear 44 to rotate about hinges 25 in the forward direction 34 and to cause the aft landing gear 46 to rotate about hinge 25 in the aft direction 36. To move to the landing position 26 from the flight position 28, the control system 12 commands the actuator to move the forward and aft landing gear 44, 46 in the opposite directions.

Figure 3:
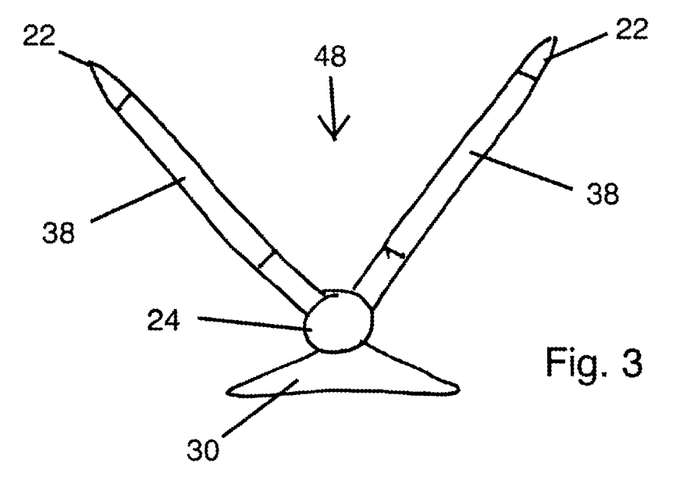
FIG. 3 is a rear view of a V-shaped control surface having an element.
Figure 4:
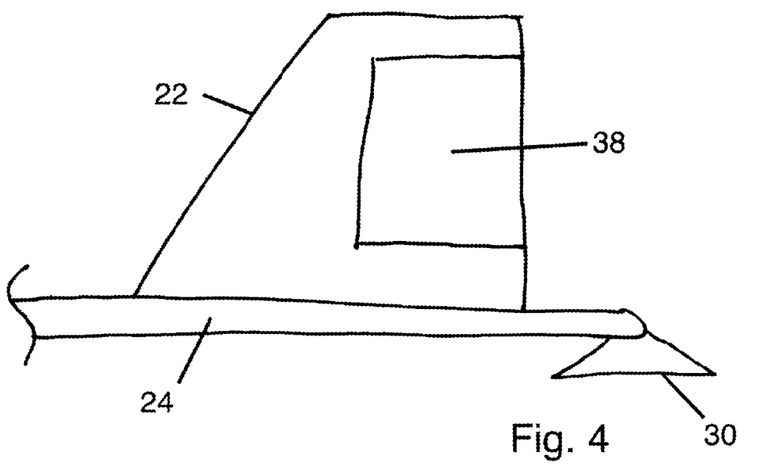
FIG. 4 is a side view of a control surface having an element.
Figure 5:
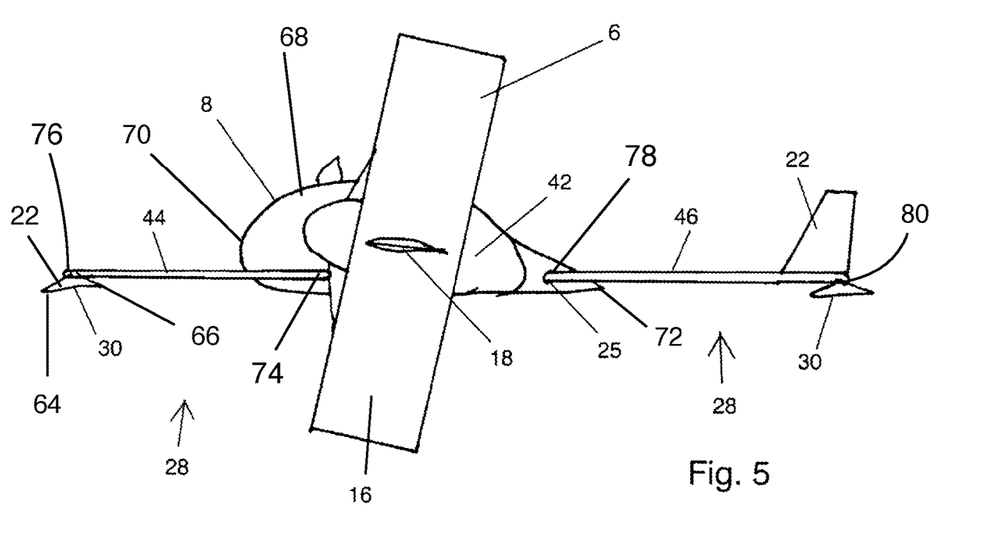
FIG. 5 is a side view of the flight module in the tilted rotor configuration with the landing gear in the flight position.

FIGS. 1-12 illustrate the control surface 22 as having a V-shape 48. A relatively small control force may act upon the control surface due to passage of air over the control surface. The control surface 22 is supported by the landing gear 24 in a spaced-apart relation to the central unit 8. The landing gear 24 therefore acts as a moment arm allowing the relatively small control force acting on the control surface 22 due to the passage of air over the control surface 22 to provide a usable control moment, and hence additional control authority, to the control system 12. That additional control authority is particularly useful to control pitch when the flight module 2 is flying in the tilted-rotor configuration with the landing gear 24 in the flight position 28 as shown by FIGS. 1, 2 and 5.

The control system 12 may utilize at least two different control strategies to control the control moments exerted by the landing gear 24. The first strategy is illustrated by FIGS. 3-5. The control surfaces 22 may include one or more movable individual elements 38. FIG. 3 is an end view of a V-shaped control surface 48 and FIGS. 3 and 5 are side views showing the V-shaped control surface 48. The individual elements 38 are movable under the control of the control system 12 in the same manner that the rudder/elevators of a conventional V-tailed aircraft are movable. The control system 12 may move the movable individual elements 38 to provide pitch and yaw moments to the flight module 2 in the same manner that a V-shaped tail provides pitch and yaw moments to a conventional aircraft. If the flight module is equipped with two V-shaped control surfaces 48, with one on the starboard side 40 of the flight module 2 and the other on the port side 42 of the flight module 2 (see FIG. 12), then differential application of the individual control elements 38 by the control system also can apply a rolling moment to the flight module 2.

Figure 6:
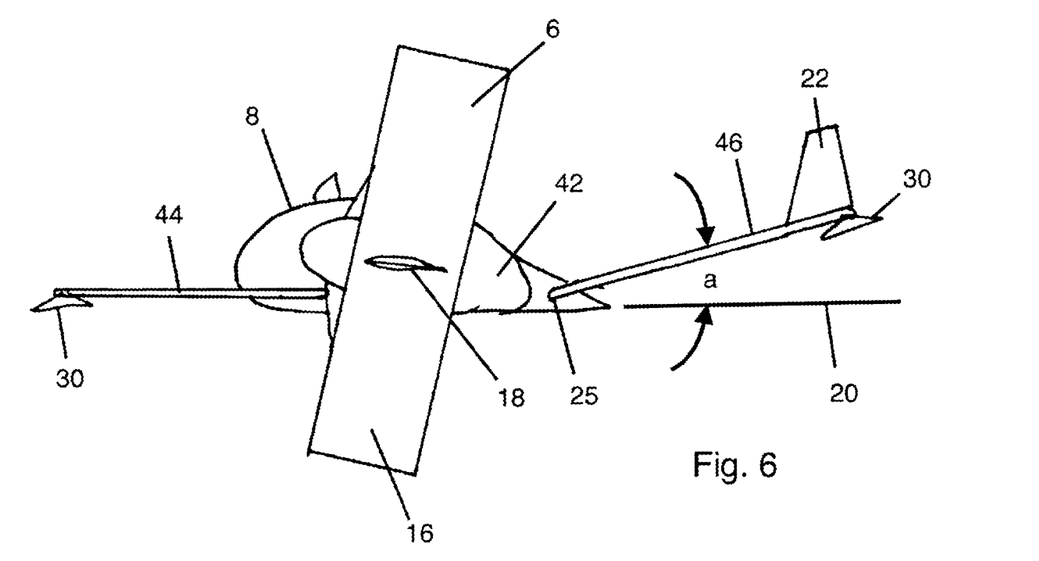
FIG. 6 is a side view of the flight module in the tilted rotor configuration with the landing gear in the flight position.
Figure 7:
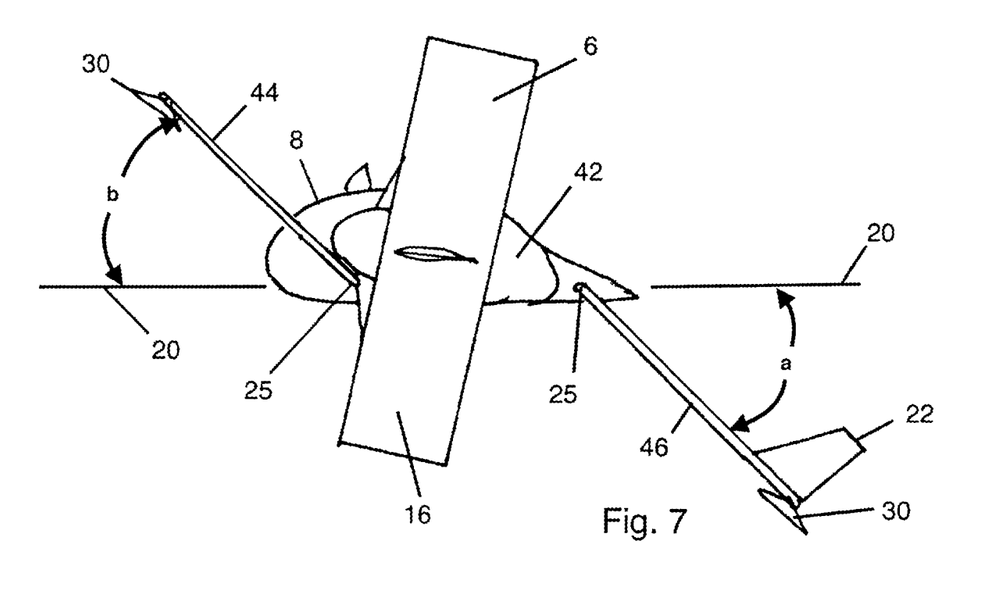
FIG. 7 is a side view of the flight module in the tilted-rotor configuration with the landing gear in the flight position.
Figure 8:
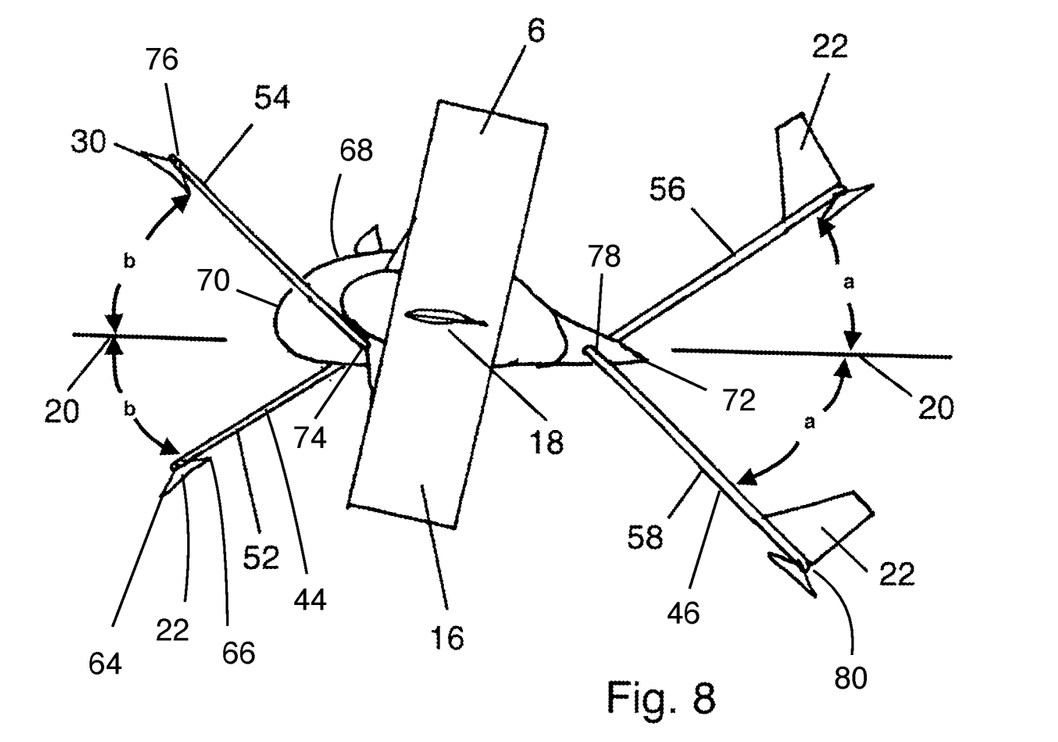
FIG. 8 is a side view of the flight module in the tilted rotor configuration with the landing gear in the flight position.

The second control strategy to control the control moments generated by the control surfaces 22 is to rotate the landing gear 24 about hinges 25, as illustrated by FIGS. 6-8. The landing gear 24 positions of FIGS. 6-8 are exaggerated for illustration. In the example of FIG. 6, the flight module is flying under the control of the control system 12 with the landing gear in the flight position shown by FIG. 1. The control system 12 determines to apply a control moment tending to pitch the flight module 2 up. The control system 12 commands actuators to rotate the aft landing gear 46 to rotate about hinge 25 so that the aft landing gear 46 define an aft landing gear angle 'a' above the longitudinal axis 20 of the central unit 8. The flow of air over the control surface 22 applies a control force to the control surface 22, and the aft landing gear 46 applies a pitch control moment to the flight module 2 to pitch the flight module up.

FIG. 7 provides a second example. In FIG. 7, the control system 12 determines that additional control authority is needed to slow the flight module 2. The control system 12 rotates the forward landing gear 44 about hinge 25 to define a forward landing gear angle 'b' above the longitudinal axis 20. The control system simultaneously rotates the aft landing gear 46 about hinge 25 to define an aft landing gear angle 'a' below the longitudinal axis 20. The forward landing gear 44 tend to pitch the flight module 2 up. The aft landing gear and control surface 22 tend to pitch the flight module 2 down. The forward and aft landing gear in combination 44, 46 act as an air brake. The control system 12 is able to slow the flight module 2 due to the increased drag while maintaining the attitude of the flight module 2.

FIG. 8 provides an additional example. In the example of FIG. 8, the forward landing gear 44 defines a starboard side forward landing gear 52 and a port side forward landing gear 54. The aft landing gear 46 defines a starboard side aft landing gear 56 and a port side aft landing gear 58. Each of the landing gears 52, 54, 56, 58 is separately controllable by the control system. Each forward landing gear 44 defines a forward landing gear first end 74 and a forward landing gear second end 76. Each aft landing gear 46 defines an aft landing gear first end 78 and an aft landing gear second end 80. In FIG. 8, the control system rotates the port side forward landing gear 54 about hinge 25 to define an angle 'b' above the longitudinal axis 20. The control system rotates starboard side forward landing gear 52 about hinge 25 to define angle 'b' below the longitudinal axis 20. The starboard side aft landing gear 56 is rotated about hinge 25 to define angle 'a' above the longitudinal axis 20. The port side aft landing gear 58 is rotated about hinge to define angle 'a' below longitudinal axis 20. The resulting control moments will apply a rolling moment to the flight module 2 tending to cause the flight module 2 to roll to the right. As shown by FIG. 8, the ground-engaging portion 30 may act as the control surface 22, which may have a control surface leading edge 64 and a control surface trailing edge 66. The control surface 22 may be integral to the structure of the landing gear 24 and may be defined by that structure.

The control system 12 may apply complex moments to the flight module 2 by moving different portions of the landing gear 24 differentially. For example, when the flight module 2 is flying in the tilted-rotor configuration with the landing gear 24 in the flight position 28, the control system 12 may determine that additional control authority is required to yaw the flight module 2 to the right. The control system 12 may respond to that need by rotating the starboard side forward landing gear 52 about the hinge 25 so that the starboard side forward landing gear 52 provides additional drag below the center of thrust of the ducted fans 6, tending to yaw the flight module 2 to the right and to pitch the flight module 2 downward. Simultaneously, the control system 12 can rotate the starboard side aft landing gear 56 about hinge 25 in the upward direction, which will tend to pitch the flight module 2 upward and also to yaw the flight module 2 to the right. The control system 12 can select the degree of relative movement of the starboard forward and aft landing gear 44, 46 so that the applied pitching moments counteract each other, leaving a yawing moment to the right.

The control system 12 may be configured to rotate each of the landing gear 52, 54, 56, 58 either alone or in combination and either in unison or differentially as needed to apply any desired net control moment to the flight module 2. Any needed combination of the positions of the four landing gear 52, 54, 56, 58 is available as needed by the control system 12 to apply any needed pitching, yawing or rolling moment to the flight module 2.

Figure 9:
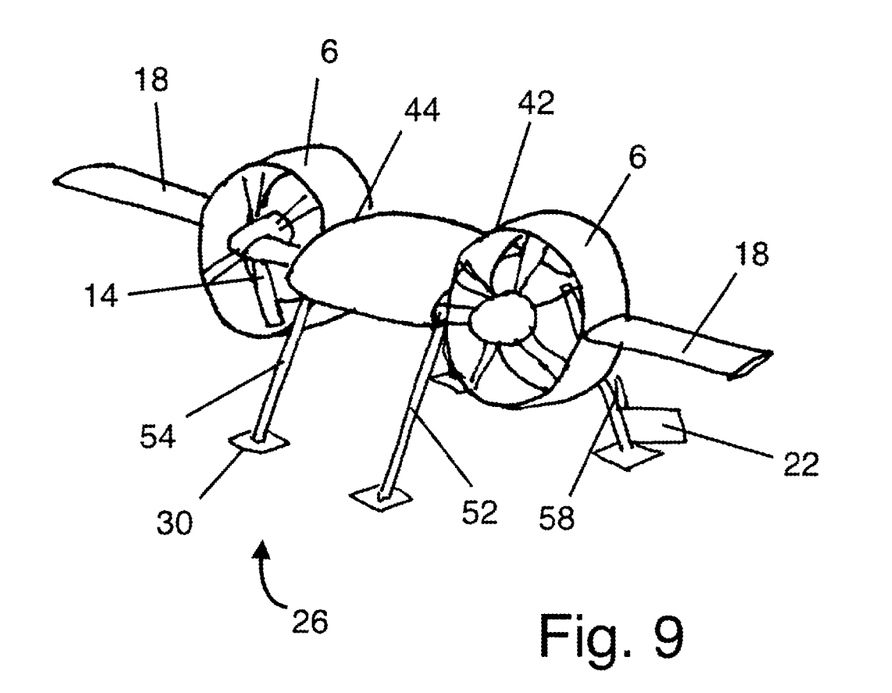
FIG. 9 is a perspective view of the flight module in the tilted rotor configuration with the landing gear in the landing position.
Figure 10:
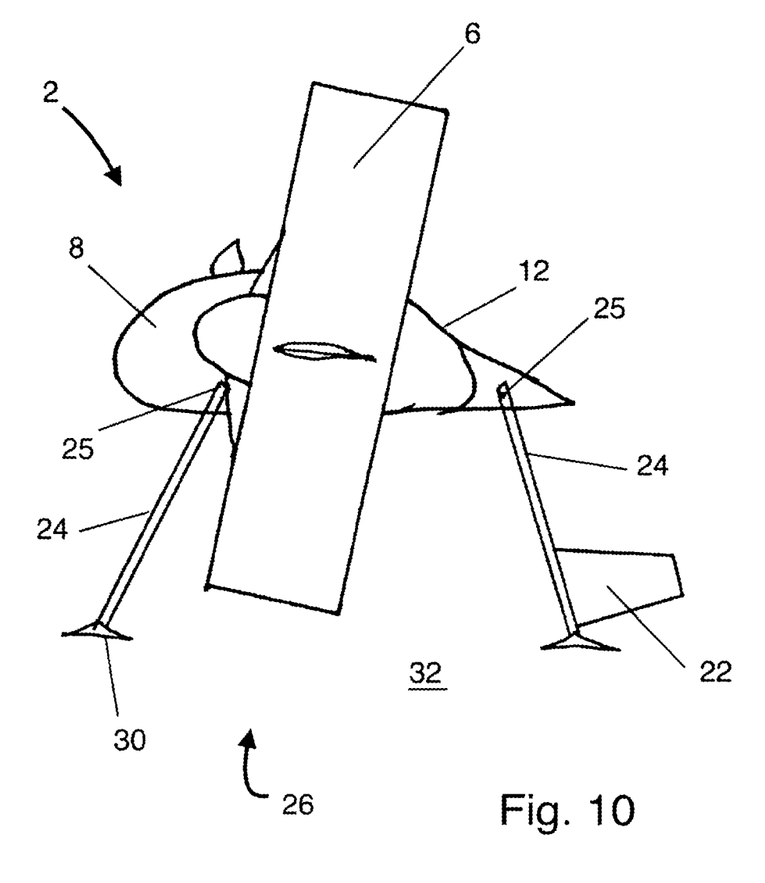
FIG. 10 is a side view of the flight module in the tilted-rotor configuration with the landing gear in the landing position.

FIGS. 9-12 illustrate the landing gear 24 in the landing position 26. FIGS. 9 and 10 depict the flight module 2 in the tilted-rotor configuration with the landing gear in the landing position 26. FIG. 11 illustrates the flight module 2 in the side-by-side configuration with the landing gear 24 in the landing position. The flight module 2 would assume the position illustrated by FIG. 11 for take off, landing and when the flight module 2 is on the ground 32. The landing gear 24 are far enough apart and support the flight module 2 on the ground 32 in a position high enough to allow the flight module 2 to straddle a mission module 4, allowing the flight module 2 to pick up and release mission modules 4 while on the ground 32.

FIG. 11 also shows the landing gear 24 in independently selectable degrees of deployment under the control of the control system 12, as when the flight module 2 lands on sloping ground 32. In the example of FIG. 11, the port side aft landing gear 58 is selected to be in a more vertical position than the starboard side aft landing gear 56, allowing the control system 12 to land and to maintain the flight module 2 in an adequately level condition when the flight module 2 lands on sloping or uneven ground 32. The control system 12 is informed by sensors to determine the appropriate degree of deployment of each landing gear 52, 54, 56, 58. The sensors may include LIDAR, RADAR, optical sensors, acoustical sensors, or any other sensors that allow the control system 12 to detect the local contour of the ground 32 and to allow the control system 12 to detect the relative elevations of each projected location on the ground 32 that will be contacted by the ground engaging portions 30 of the landing gear 24 at a projected landing location when the flight module is approaching the ground 32 for landing.

FIG. 12 is a rear view of the flight module 2 attached to a mission module 4 on the ground 32. The port side landing gear 54, 58 and the starboard side landing gear 52, 56 are disposed on either side of the mission module 4, straddling the mission module 4.

In addition to rotating in the fore and aft directions to select the degree of deployment, the landing gear 24 may be configured to also rotate laterally to the port and starboard sides. To achieve the lateral rotation, the hinges 25 connecting the landing gear 24 to the aircraft may define ball joints or compound hinges allowing movement in two directions. Each landing gear 24 may be attached to one or more landing gear effectors, such as a hydraulic cylinder or stepper motor, to select the degree of deployment in the fore and aft directions and in the lateral directions.

Figure 13:
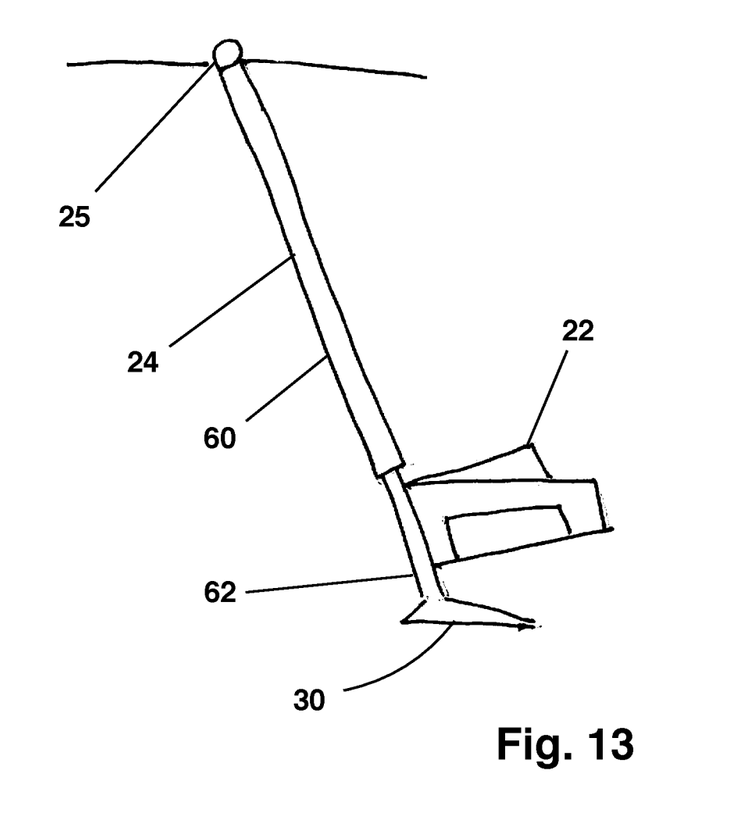
FIG. 13 is a detail view of an extendable landing gear.

From FIG. 13, the landing gear 24 also may be extendable, so that the length of the landing gear 24 from the hinge 25 to the ground-engaging portion 30 or the control surface 22 may be selected under the control of the control system 12 or under the control of a human passenger of a mission module 4 attached to the flight module 2 or by a remote controller. The extendable length of the landing gear 24 allows selection of the moment arm through which the control force applied to the control surface 22 acts on the aircraft. If the control system 12 requires additional control authority form a control surface 22, the control system 12 can extend the landing gear 24 attached to that control surface 22 so that the control surface 22 acts on the aircraft through a longer moment arm. The extendable landing gear 24 also allows the greater greater flexibility in landing on uneven terrain. The landing gear 24 may be able to reach farther to prevent the aircraft from rolling on a steep slope.

The landing gear 24 may include telescoping or folding upper and lower portions extended and retracted by length control effectors, all under the control of the control system. The length control effectors may be lead screws, hydraulic cylinders, rack and pinion gears, block and tackle, compressed gas or any other mechanism known in the art for moving one object with respect to another.

The ground-engaging portion 30 of the landing gear may include wheels or tracks for movement when the aircraft is on the ground and supported by the landing gear. The wheels or tracks may be powered by motors, such as electrical or hydraulic motors powered by the aircraft engines.

LIST OF ELEMENTS

The following is a list of numbered elements from the drawings and specification:
flight module 2
mission module 4
two ducted fans 6
Central unit 8
Engines 10
Control system 12
Rotors 14
Duct 16
Wing extension 18
Longitudinal axis 20
control surface 22
landing gear 24
hinge 25
landing position 26
flight position 28
ground-engaging portion 30
ground 32
forward direction 34
aft direction 36
individual element 38
starboard side 40
port side 42
forward landing gear 44
aft landing gear 46
aft landing gear angle 'a'
forward landing gear angle 'b'
'V' shaped 48
starboard side forward landing gear 52
port side forward landing gear 54
starboard side aft landing gear 56
port side aft landing gear 58
landing gear upper portion 60
landing gear lower portion 62
Control surface leading edge 64
Control surface trailing edge 66
Fuselage 68
Fuselage leading edge 70
Fuselage trailing edge 72
Forward landing gear first end 74
Forward landing gear second end 76
Aft landing gear first end 78
Aft landing gear second end 80

What is claimed is:

1. A landing gear apparatus for a vertical take off and landing aircraft, the aircraft having a longitudinal axis that defines a forward direction, the apparatus comprising:
   a. a forward landing gear, said forward landing gear having a first end and an opposing second end, said first end is rotatably attached to the aircraft and configured to rotate between a flight position and a landing position, said second end defining a ground-engaging portion, said ground-engaging portion being configured to engage a ground when the forward landing gear is in the landing position;
   b. when the aircraft is flying in said forward direction and said forward landing gear is in said flight position, said second end of said forward landing gear extends forward of said first end and generally parallel to the longitudinal axis of the aircraft;
   c. a forward flight control surface located at said second end of said forward landing gear, said forward flight control surface defining a leading edge and a trailing edge, said leading edge is forward of said second end and said trailing is aft of said second end when said forward landing gear is in said flight position, said forward landing gear being configured so that when the aircraft is flying through an air in the forward direction and said forward landing gear is in said flight position, said air through which the aircraft flies flows across-said forward flight control surface from said leading edge to said trailing edge.

2. The landing gear apparatus of claim 1 wherein the aircraft defines a fuselage, said fuselage defining a fuselage leading edge, when the aircraft is flying in said forward direction and said forward landing gear is in said flight position, said forward landing gear extending in said forward direction beyond said fuselage leading edge.

3. The landing gear apparatus of claim 1 wherein the aircraft defines an aft direction opposite to the forward direction, the apparatus further comprising:
   a. an aft landing gear, said aft landing gear having an aft landing gear first end and an opposing aft landing gear second end, said aft landing gear first end is rotatably attached to the aircraft and configured to rotate between said flight position and said landing position;
   b. when said aft landing gear is in said flight position, said aft landing gear second end extends in said aft direction generally parallel to the longitudinal axis of the aircraft, whereby when the aircraft is flying through said air in said forward direction and said aft landing gear is in said flight position, said air through which the aircraft flies flows with respect to said aft landing gear from said aft landing gear first end toward said aft landing gear second end.

4. The landing gear apparatus of claim 3, the apparatus further comprising: an aft flight control surface defined by said aft landing gear, said aft landing gear first end being rotatable to define an aft landing gear angle with respect to a horizontal plane passing through the aircraft longitudinal axis when the aircraft is in level flight, said aft landing gear angle is selectable by said control system, said aft landing gear angle determining an angle of attack of said aft flight control surface with respect to said air through which the aircraft flies and which flows over said aft flight control surface when the aircraft is flying in said forward direction, whereby said aircraft control system selects said angle of attack of said aft control surface with respect to said air by selecting said aft landing gear angle with respect to said horizontal plane.

5. The landing gear apparatus of claim 4 wherein said forward landing gear defines a forward landing gear angle with respect to said horizontal plane, said forward landing gear angle is selectable by said control system, said forward landing gear angle determining said angle of attack of said forward flight control surface with respect to said air through which the aircraft flies and that passes over said forward flight control surface when the aircraft is flying in said forward direction, whereby said aircraft control system selects said angle of attack of said forward control surface with respect to said air by selecting said forward landing gear angle with respect to said horizontal plane.

6. The landing gear of claim 5 wherein said forward landing gear comprises a port forward landing gear and a starboard forward landing gear and wherein said aft landing gear comprises an aft port landing gear and an aft starboard landing gear, and wherein said angle of attack of said control surfaces of each of said forward and aft landing gear are separately controllable by said control system.

7. The landing gear apparatus of claim 3 wherein the aircraft defines a fuselage and said aft landing gear is rotatably attached to said fuselage and wherein said aft landing gear is fixed with respect to said fuselage when said aft landing gear is in said flight position, the apparatus further comprising: an aft flight control surface defined by said aft landing gear, said aft flight control surface defining a movable individual element, said movable individual element being movable by said control system when the aft landing gear is in said flight position, said movable individual element being configured to apply a control moment to the aft landing gear and to the aircraft under the control of the control system.

8. The landing gear apparatus of claim 7 wherein the aircraft defines a fuselage, said fuselage defining a fuselage trailing edge, said aft landing gear when in said flight position extends in said aft direction beyond said fuselage trailing edge.

9. The landing gear apparatus of claim 8 wherein said aft flight control surface is a pair of aft flight control surfaces that together define a dihedral having a V-shape, each of said aft flight control surfaces defines said movable individual element, each said individual movable element being separately movable by said control system, said control system being configured to cause said pair of aft control flight control surfaces to move as a rudder/elevator of a V-tailed conventional aircraft moves to provide pitch moments and yaw moments to the flight module.

10. The landing gear apparatus of claim 9 wherein said forward landing gear comprises a port forward landing gear and a starboard forward landing gear and wherein said aft landing gear comprises an aft port landing gear and an aft starboard landing gear, said forward landing gear and said aft landing gear depend from said fuselage when said forward and said aft landing gear are in said landing position and wherein the aircraft is a flight module having two ducted fans that are tiltable between a side-by-side position and a tilted-rotor position, said forward landing gear and said aft landing gear being in said flight position when said two ducted fans are in said tilted-rotor position, said flight module is configured to support a mission module in flight, said forward and aft landing gear are configured to straddle said mission module and to support said mission module and said flight module on a ground when said forward and aft landing gear are in said landing position.

11. The landing gear of claim 1 wherein said ground-engaging portion defines said flight control surface.

\* \* \* \* \*